Jan. 14, 1964   S. H. CREED ETAL   3,117,605
METHOD OF CORING FRUIT
Original Filed Dec. 26, 1957
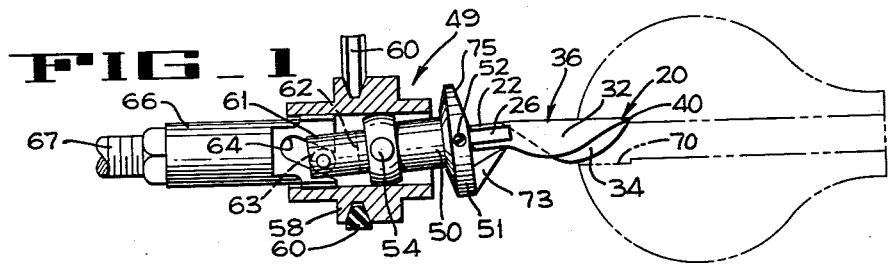
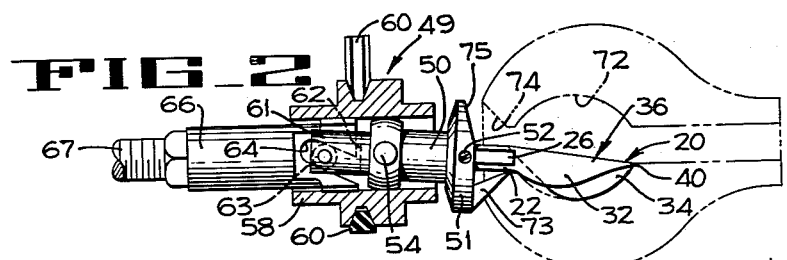
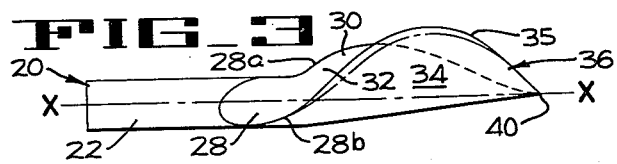
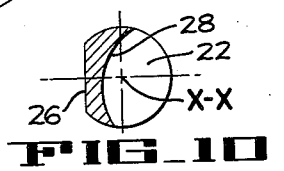
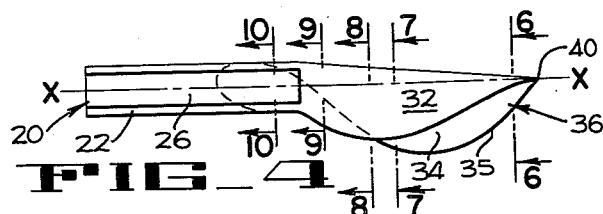
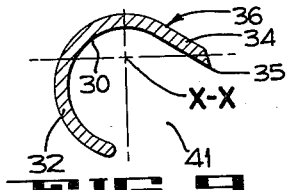
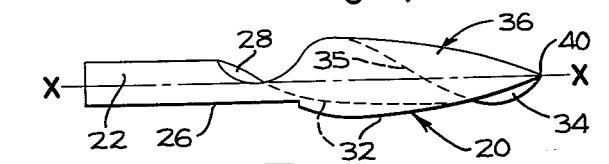
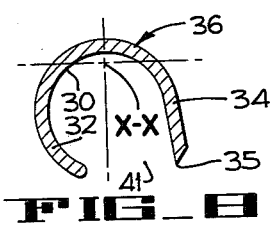
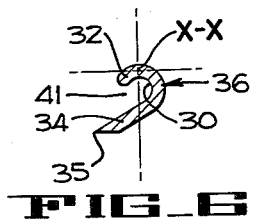
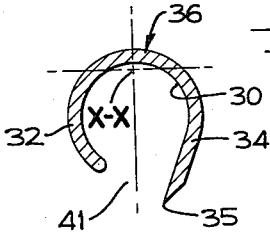
INVENTORS
SHERMAN H. CREED
SYLVIO PUCCINELLI
BY Hans G. Hoffmeister
ATTORNEY

United States Patent Office 3,117,605
Patented Jan. 14, 1964

3,117,605
METHOD OF CORING FRUIT
Sherman H. Creed and Sylvio Puccinelli, San Jose, Calif., assignors to FMC Corporation, San Jose, Calif., a corporation of Delaware
Original application Dec. 26, 1957, Ser. No. 705,337, now Patent No. 3,030,991, dated Apr. 24, 1962. Divided and this application June 29, 1961, Ser. No. 124,282
2 Claims. (Cl. 146—238)

This invention appertains to fruit preparation apparatus and more particularly relates to an improved device for coring a fruit, such as a pear, while the fruit is in a substantially whole condition.

This application is a division of our copending application Serial No. 705,337, now Patent No. 3,030,991.

Several devices have heretofore been proposed for coring fruit while the fruit is in a one piece or whole condition. Such devices are provided with cutters that are arranged to cut into one end of a fruit which is being held in fixed position, and cut the core into small pieces. Thereafter, the cutter is withdrawn and a jet of fluid is directed into the core cavity to wash the fragments of core material out of the cavity. Such a coring operation takes considerable time and does not always produce a clean core cavity.

Accordingly, an object of the present invention is to provide an improved method of coring fruit.

Another object is to provide an improved method for quickly and efficiently coring a fruit, such as a pear.

Another object is to provide a method of forcing core material out of the core cavity while the core material is being cut to form the cavity.

Other and further objects will become apparent form the following description taken in connection with the accompanying drawings in which:

FIG. 1 is a fragmentary diagrammatic side elevation, with parts in section, of the novel coring cutter and a portion of the cutter atcuating mechanism.

FIG. 2 is a view identical to FIG. 1, but showing a second position of the cutter and the cutter actuating mechanism.

FIG. 3 is an enlarged side elevation of the coring cutter cutter of the present invention.

FIG. 4 is an elevation of the side of the coring cutter opposite to the side shown in FIG. 3.

FIG. 5 is an enlarged plan of the coring cutter.

FIG. 6 is a vertical section taken along line 6—6 of FIG. 4.

FIG. 7 is a vertical section taken along lines 7—7 of FIG. 4.

FIG. 8 is a vertical section taken along lines 8—8 of FIG. 4.

FIG. 9 is a vertical section taken along lines 9—9 of FIG. 4.

FIG. 10 is a vertical section taken along lines 10—10 of FIG. 4.

In FIGS. 3, 4 and 5 a preferred embodiment 20 of the coring cutter of the present invention is illustrated. This cutter comprises a cylindrical shank 22 having a flattened surface 26 formed longitudinally along one edge. A wide groove or recess 28 is formed in the forward end of the shank and this groove extends around the shank and forwardly, as seen in FIG. 3, to communicate with a chamber 30 formed between walls 32 and 34 of a recurved blade 36. The wall 32 is a guide wall and is formed as a continuation of a side edge portion 28a of the groove 28. The wall 34 has a sharpened edge 35 and is formed as a continuation of a side edge portion 28b of the groove 28. This wall 34, which has a spiral configuration, projects radially outwardly from the axis of rotation X—X, of the shank 22 and is inclined rearwardly. Therefore when the cutter is rotated clockwise as seen in FIG. 6, the blade 36 cuts into the core material and forces it rearwardly along the chamber 30 into the discharge passage provided by the groove 28.

It will be noted in FIG. 4 that the forward ends of the two walls 32 and 34 join at a point 40 that is substantially on the axis of rotation X—X of the cylindrical shank 22 of the cutter. Immediately behind the point 40, the chamber 30 is relatively small (FIG. 6) and the walls 32 and 34 are close to each other. Near the longitudinal midpoint of the cutter, the chamber 30 is enlarged (FIGS. 7 and 8) and the cutter has a generally U-shaped cross-section. As seen in FIG. 9, adjacent the rear of the cutter, the walls are further apart so that the chamber 30 opens out as it joins the wide groove 28 in the shank.

Referring to FIGS. 6, 7, 8 and 9 it is to be noted that the entrance opening 41 to the chamber 30, defined between the walls 32 and 34, shifts in a counterclockwise direction as it progresses rearwardly from the forward end of the cutter (FIG. 6) to the rearward end (FIG. 9). Thus the pumping passage formed by the chamber 30 and the groove 28 is curved or spiralled around the axis X—X of the cutter. Also, it should be noted that although the passage has a spiral configuration, it has a predominantly longitudinal trend so that material is forced rearwardly rapidly after receiving its initial rearward push from the rear surface of wall 34.

In FIGS. 1 and 2 the improved coring cutter 20 of the present invention is illustrated in connection with a cutter actuating mechanism 49 of the type shown and described in the copending application for patent of Sherman H. Creed, Serial No. 601,541, filed August 1, 1956, now Patent No. 2,969,098. In general, the actuating mechanism comprises a pivot member 50 having at one end a collar 51 in which the shank 22 of the cutter 20 is secured by a setscrew 52. The member 50 is pivotally mounted by two aligned pins 54 (one only being shown) in a pulley 58 which is arranged to be rotated by a belt 60.

The rearward end 61 of the member 50 has a groove 62 formed therein, and a rotatable roller 63 projects across the groove in a position to be received in a slanted camming slot 64 in an extension 66 of a push rod 67. As fully explained in the above-identified application S.N. 601,541, axial movement of the push rod 67 causes pivoting movement of the pivot member 50 while the pivot member 50 is being rotated. As a result, when the cutter contacts a pear aligned therewith, a relatively small cylindrical opening 70 (FIG. 1) is cut in the end of the pear while the axis of the cutter is aligned with the axis of the push rod 67 and the stem-blossom axis of the pear. As the pear is moved inwardly toward the cutter and the cutter penetrates the pear to a greater extent, it pivots and cuts an enlarged core cavity 72 as seen in FIG. 2, and the butt-end trimming knife 73, carried by the pivot member 50, makes a segmental conical recess 74 in the butt-end of the pear.

Due to the pivoting of the cutter in the fruit, the cutting is done by the sharpened side edge 35 of the wall 34, and a ribbon of core material is cut and forced laterally into the pumping chamber 30 of the cutter and then rearwardly to the discharge passage. As seen in FIGS. 6, 7 and 8, the opening between the walls 32 and 34 is only large enough to provide an adequate entrance opening for the ribbon of core material. The wall 32 overlies the material in the pumping passage and confines it in the passage so that it can move only rearwardly toward the discharge passage. At the conclusion of the coring operation, the cutter is pivoted back to its initial position and the pear is moved outwardly and away from the cutter. It is obvious that the removal of the cutter from the pear leaves a clean core cavity within the pear.

Another feature of the present invention is the provision of a relieved portion 75 (FIG. 2) on the collar 51 of the pivot member 50 to provide an additional discharge passage between the collar and the wall recess 74 at the butt-end of the pear.

From the foregoing description it will be seen that the present invention provides a novel method of coring fruit and an efficient cutter for carrying out the method. The use of a spiralled, longitudinal pumping passage in the coring cutter provides a cutter which not only cuts up the core material but also pumps it rearwardly out of the core cavity and thus reduces the time and mechanism required for obtaining a clean core cavity.

It will be understood that modifications and variations may be resorted to without departing from the scope of the concepts of the invention. Therefore, the scope of the invention should be limited only by the scope and proper interpretation of the claims appended hereto.

Having thus described the invention, what we claim as new and desire to protect by Letters Patent is:

1. A method of coring pears comprising cutting a small diameter entrance opening in one end of the pear along the stem-blosom axis by rotating a cutting instrument along the said axis, moving the pear and cutting instrument axially relatively to each other so that said cutting instrument will penetrate the pear to a greater extent, pivoting the cutting instrument to cause it to cut a larger diameter portion of the core of the pear, and concurrently removing the cut portion of the pear by pumping such portion rearwardly out of the entrance opening during continued cutting of the core and without removing the cutting instrument from the core.

2. The method of claim 1 including the additional step of separating the pear and cutting instrument to leave a substantially clean core cavity in the pear.

References Cited in the file of this patent
UNITED STATES PATENTS

| | | |
|---|---|---|
| 1,605,677 | McCarthy | Nov. 2, 1926 |
| 1,766,824 | Jones | June 24, 1930 |
| 2,359,881 | Serr | Oct. 10, 1944 |
| 2,969,098 | Creed | Jan. 23, 1962 |
| 3,018,179 | Coons et al. | Jan. 23, 1962 |